March 5, 1963  G. R. HOFFMASTER  3,079,609
HEADGEAR SUSPENSION FOR WELDING HELMET
Filed Dec. 30, 1959

INVENTOR.
George R. Hoffmaster
BY
*William J. Ruano*
his ATTORNEY 3,079,609
HEADGEAR SUSPENSION FOR WELDING
HELMET
George R. Hoffmaster, Reading, Pa., assignor to The
Electric Storage Battery Company, Philadelphia, Pa.
Filed Dec. 30, 1959, Ser. No. 862,982
2 Claims. (Cl. 2—8)

This invention relates to a headgear assembly for pivotally supporting or suspending a welding shield or helmet or other face protective device, and, more particularly, relates to adjusting means therefor.

An outstanding disadvantage of conventional headgear suspensions for welding shields or helmets is that the adjusting means for adjusting the girth of the headband is usually of complicated and expensive construction, which not only increases manufacturing costs but is time consuming to effect adjustment.

An object of the present invention is to provide a novel headband suspension for pivotally supporting a welding shield or helmet in an adjustable manner and which overcomes the above named disadvantages of prior devices.

A more specific object of the invention is to provide, in a headgear for suspending a welding shield or helmet, a simple and inexpensive means for adjusting the girth of a headband by the simple expedient of pulling out a spring finger piece and shifting it laterally into engagement with any one of a plurality of ratchet teeth.

Other objects and advantages will become more apparent from a study of the following description taken with the accompanying drawing wherein.

Figure 1:
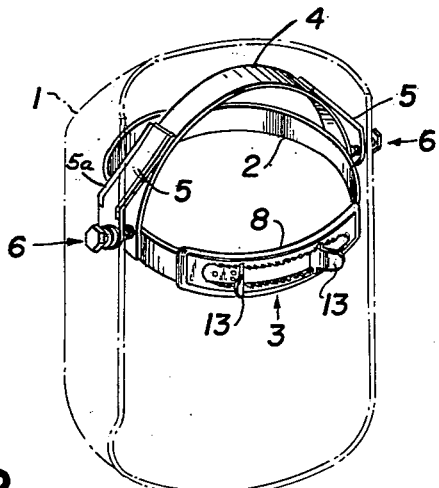
FIG. 1 is a rear perspective view of a headgear assembly for supporting a welding helmet and embodying the principles of the present invention.

Referring more particularly to FIG. 1 of the drawing, numeral 1 denotes a welding helmet or shield shown in dash and dot outline since it, per se, forms no part of the present invention. Other face protective devices may be suspended instead by the present invention.

Helmet 1 is pivotally suspended by a headgear comprising a headband 2 in the form of a flexible strap of plastic or other suitable material, the end portions of which project partially into a flat tubular element 8 of arcuate shape, preferably of the same material, forming part of the girth adjusting means 3.

A crown strap 4, also preferably of the same plastic material as strap 2 and tubular element 8, has end portions which are riveted or otherwise fastened to diametrically opposite side portions of headband 2. Lateral extensions 5, preferably reinforced by metallic strips 5a partially wrapped therearound, are riveted or otherwise fastened to opposed portions of crown strap 4 to serve as spaced flexible supports onto which shield 1 is pivotally mounted by nut assemblies 6, which provide adjustable friction between shield 1 and extensions 5.

Figure 2:
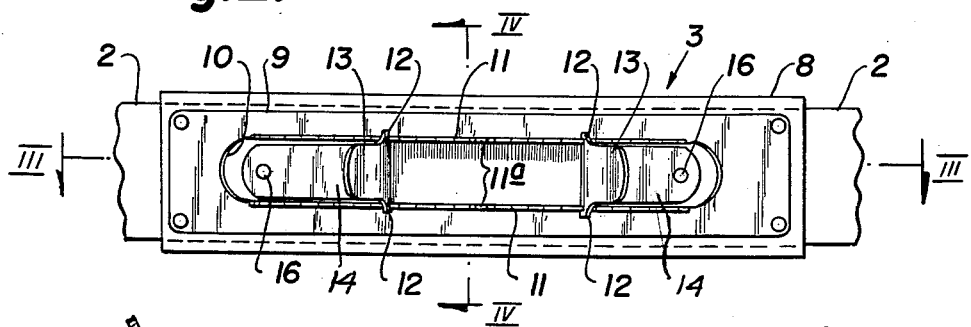
FIG. 2 is an enlarged, rear view of the girth adjusting means thereof.
Figure 3:
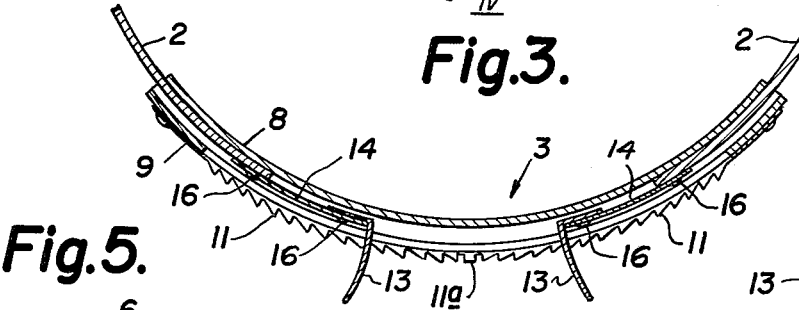
FIG. 3 is a horizontal cross-sectional view taken along line III—III of FIG. 2.
Figure 4:
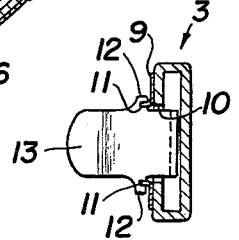
FIG. 4 is a vertical cross-sectional view taken along line IV—IV of FIG. 2; and, FIG. 5 is an exploded view of the pivotal adjusting means 6 shown in FIG. 1.

The girth adjusting means is more clearly illustrated in FIGS. 2, 3 and 4 and comprises a thin metallic strip 9 molded or riveted at its corners to the flattened, slotted tube 8, which strip is provided with an elongated slot 10, the top and bottom portions of which slot are defined by ratchet teeth 11 which are integral with strip 9. To the ends of headband straps 2 are attached, by means of rivets 16 or the like, a pair of leaf springs 14. To the free ends of leaf springs 14 are rigidly secured, by means of rivets 16 or the like, finger pieces 13 of metal or other suitable material. Integral pawl or dog portions 12 extend vertically upwardly and downwardly from finger pieces 13 and are adapted to engage ratchet teeth 11.

In operation, when either finger piece 13 is grasped and pulled outwardly, it will flex its leaf spring 14 and will free its pawl portion 12 from the ratchet teeth, thereby enabling pulling of the finger piece 13 horizontally in the direction of the longitudinal slot 10 until the desired girth adjustment of the headband 2 is obtained. The finger piece 13 is then released, whereupon leaf spring 14 will automatically return and hold pawl portion 12 in engagement with the newly selected ratchet teeth. The same type of adjustment is obtainable with either of the finger pieces. Actually both finger pieces can be pulled out simultaneously, if desired, with both thumbs and forefingers (or even with one thumb and forefinger) to enable very fast as well as accurate adjustment of the girth of the headband to fit the headsize of the wearer. The limit of the adjustment is the end portions of slot 10 which serve to limit outward movement of the respective finger pieces 13.

Figure 5:
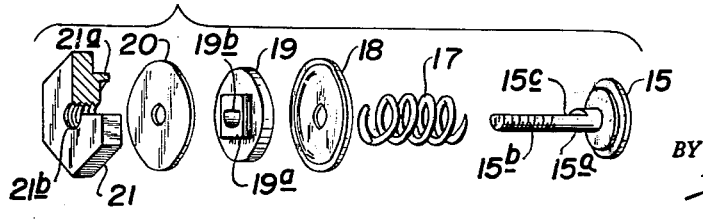

A pivotal adjustment 6, extending through holes on opposite sides of the helmet, is for the purpose of varying the degree of frictional engagement between extensions 5 and welding helmet 1, which is shown in more detail in the exploded view of FIG. 5. It comprises a shank 15a having an integral head 15 to serve as a stop for one end of a helical spring 17 which surrounds the shank 15a. Half of the shank is cut-away at 15c and the remainder is threaded at 15b. The threaded portion extends through a cup washer 18 and through a correspondingly shaped hole 19b formed in an integral square extension 19a of washer 19, also it projects through a hole in washer 20 so that the threaded portion 15b threadedly engages thread 21b of an adjusting nut 21. Nut 21 has a collar portion 21a which abuts against washer 20. The side of welding shield 1 extends between washer 18 and washer 19. Thus by tightening nut 21, spring 17 is compressed to provide a greater amount of friction between washers 18 and 19 and the side portions of shield 1 therebetween. This provides an easy adjustment which can be made from the outside of shield 1 for the purpose of varying the amount of resistance against pivotal movement of the shield, enabling the shield to be frictionally held in any desired pivotal position relative to the crown strap.

It will be understood that one of the finger pieces may be omitted, together with its associated parts, and the associated end of the headband strap may be rigidly secured to tube 8 if sufficient adjustment can be had with one finger piece.

Thus it will be seen that I have provided an efficient headgear suspension for a welding shield or helmet and which is also suitable for pivotally suspending a face shield, goggles or any other face protective device, including adjusting means to enable easy adjustment of frictional resistance against movement, as well as to enable easy adjustment of the girth of the headband so that it may be fitted to the head size of any wearer by the mere pulling out and lateral shifting of finger pieces; furthermore, I have provided a headband adjustment comprising a minimum number of simple and inexpensively manufactured parts, which adjustment may be operated easily and very quickly by the fingers of the wearer to increase or decrease the headband size.

While I have illustrated and described a single specific embodiment of my invention, it will be understood that this is by way of illustration only, and that various changes and modifications may be made within the contemplation

I claim:

1. In a headgear assembly for pivotally supporting a face protective device, comprising a headband strap and a crown strap having ends connected to diametrically opposite side portions of said headband strap, an arcuate, flattened tube into which the end portions of said headband strap project, a leaf spring having one end connected to an extremity of the headband and extending longitudinally inside said tube, an elongated slot formed on the outside portion of said flattened tube and of greater width than the leaf spring, a metal strip attached to the outside of said flattened tube, said metal strip having a longitudinal slot coinciding with said elongated slot, ratchet teeth integrally formed along the top and bottom edges of said longitudinal slot in said metal strip and extending outwardly thereof, a finger piece projecting from the outside into said slot and having an inner end rigidly secured to the free end of said leaf spring, said finger piece having a pair of laterally extending pawl portions for engaging said top and bottom ratchet teeth, whereby upon pulling said finger piece outwardly, said pawl portions are retracted from said teeth against the tension of said leaf spring to enable shifting of the finger piece in the longitudinal direction of the slot to vary the extent of projection of an end portion of the headband into the flattened tube, thereby varying the girth of the headband.

2. In a headgear assembly for pivotally supporting a face protective element, comprising a headband strap, an arcuate flattened tube into which the end portions of said headband strap project, a pair of leaf springs, each having one end connected to an end portion of said headband and extending longitudinally inside said tube, an elongated slot formed on the outside portion of said tube, a finger piece connected to the other end of each leaf spring and extending through the slot and having a pawl portion, ratchet teeth projecting along the longitudinal edge portions of said slot and being oppositely shaped with relation to the center of said slot in a manner so that when both said finger pieces are squeezed together and then released the pawl portions thereof will become latched to teeth closer to the center of the slot so as to reduce the girth of said headband.

References Cited in the file of this patent

UNITED STATES PATENTS

| | | |
|---|---|---|
| 880,116 | Arnow | Feb. 25, 1908 |
| 1,172,051 | Rogers | Feb. 15, 1916 |
| 1,787,202 | Kendall | Dec. 30, 1930 |
| 2,503,432 | Bowers | Apr. 11, 1950 |
| 2,658,200 | Bowers | Nov. 10, 1953 |
| 2,747,191 | Hoffmaster | May 29, 1956 |